United States Patent [19]

Riedel et al.

[11] Patent Number: 5,039,632
[45] Date of Patent: Aug. 13, 1991

[54] SI C POWDER, A PROCESS FOR ITS PRODUCTION AND ITS USE

[75] Inventors: Ralf Riedel, Leinenfelden-Echterdingen; Gerd Passing, Gerlingen; Günter Petzow, Leinenfelden-Echterdingen; Wolfgang Krumbe; Gerhard Franz, both of Krefeld, all of Fed. Rep. of Germany

[73] Assignee: Bayer AG, Leverkusen, Fed. Rep. of Germany

[21] Appl. No.: 416,933

[22] Filed: Oct. 4, 1989

[30] Foreign Application Priority Data

Oct. 8, 1988 [DE] Fed. Rep. of Germany ....... 3834325

[51] Int. Cl.$^5$ .............................................. C04B 35/56
[52] U.S. Cl. ...................................................... 501/92
[58] Field of Search ............................... 501/88, 90, 92

[56] References Cited

U.S. PATENT DOCUMENTS 4,004,934  1/1977  Prochazka .
4,108,929  8/1978  Prochazka .
4,209,474  6/1980  Prochazka ........................ 264/29.5
4,295,890 10/1981  Stroke .
4,336,216  6/1982  Watanabe et al. .................. 264/65
4,663,105  5/1987  Sakai et al. ........................ 264/66
4,701,427 10/1987  Boecker et al. ..................... 501/92
4,853,299  8/1989  Mizutani et al. ................... 428/698

FOREIGN PATENT DOCUMENTS 0110053  6/1984  European Pat. Off. .
0266641  5/1988  European Pat. Off. .
3630369  3/1987  Fed. Rep. of Germany .
2011879  7/1979  United Kingdom .

Primary Examiner—William R. Dixon, Jr.
Assistant Examiner—Chris Gallo
Attorney, Agent, or Firm—Connolly & Hutz

[57] ABSTRACT

The present invention relates to an SiC powder suitable for the production of SiC sintered ceramics with compounds applied to its surface, these compounds being boron nitride and carbon; processes for production of the SiC powders; and the use of these powders to produce SiC sintered mouldings.

10 Claims, 1 Drawing Sheet

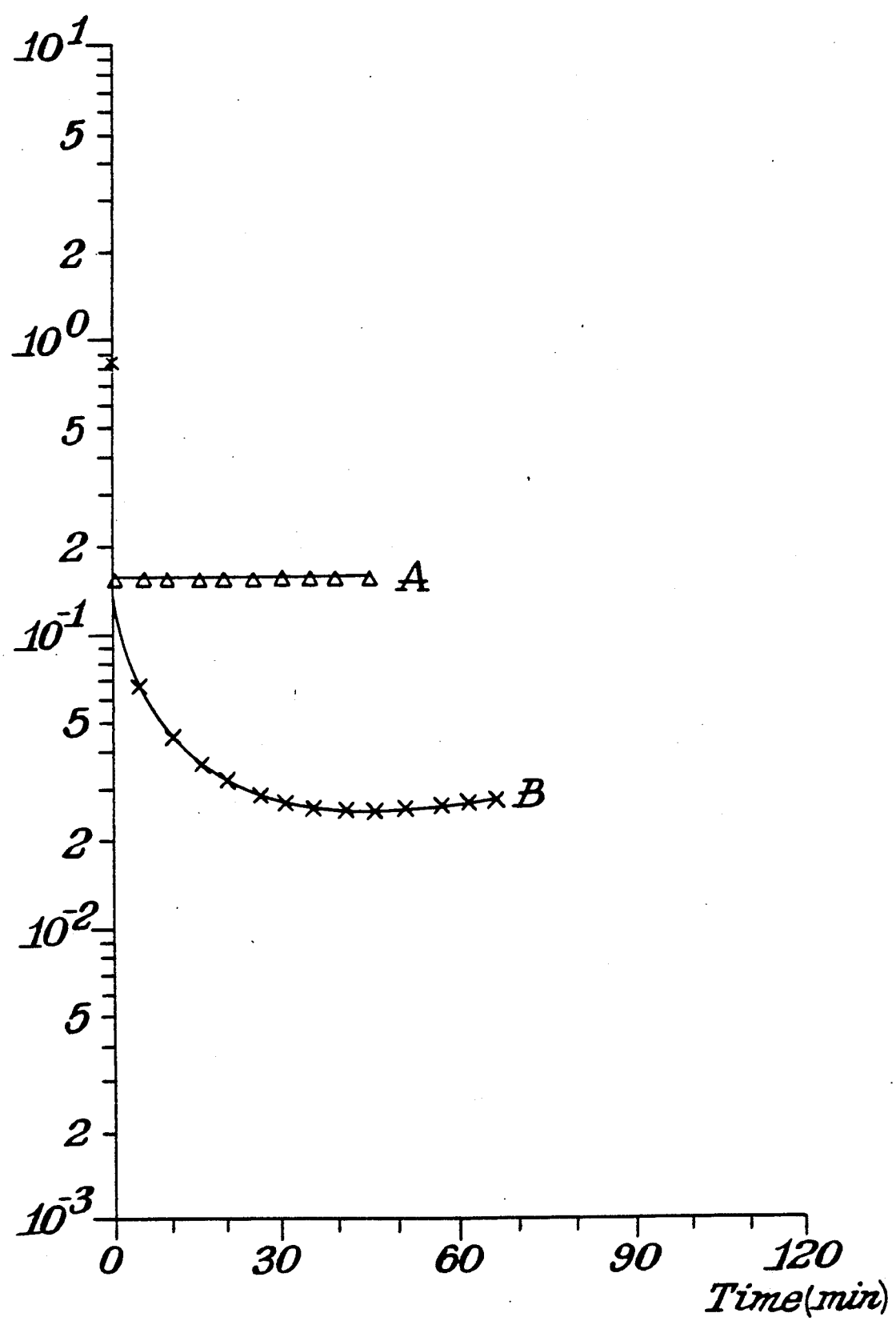

SI C POWDER, A PROCESS FOR ITS PRODUCTION AND ITS USE

This invention relates to an SiC powder suitable for the production of SiC sintered ceramics and having compounds constituting a surface coating, these compounds being boron nitride and carbon, to processes for the production of the SiC powder and to the use of this powder to produce SiC sintered mouldings.

BACKGROUND OF THE INVENTION

SiC is normally sintered under pressure or in the absence of pressure at 1900° to 2300° C. with addition of carbon, boron-containing and aluminium-containing compounds (see U.S. Pat. Nos. 4,295,890 and 4,004,934).

The additives used are Al or $Al_2O_3$, $Al_4C_3$, AlN or B $B_2O_3$, $B_4C$, BN or BP, in each case together with elemental carbon (graphite). However, the homogeneous distribution of these solids with SiC is difficult and requires elaborate grinding processes. Accordingly there is a general need for processes by which the sintering aids can be homogeneously deposited.

One such process is known from DE-C 2 856 593. In this process the boron component is applied in the form of boron oxide or boric acid and the carbon in the form of synthetic resins to SiC matrix powder from a methanolic solution.

The deposition of carborane, $B_{10}H_{12}C_2$, dissolved in acetone on SiC powder is described in "Journal of the Ceramic Society of Japan" 96 [2] (1988) 211–216. The carborane is then converted by pyrolysis into boron carbide. However, this process is uneconomical on account of the expense involved in the production of its starting components. Another disadvantage is that after the decomposition the carbon in the carborane is not sufficient for sintering SiC powder and that additional carbon is required, this being introduced in the form of synthetic resins as described above.

DE-A 36 30 369 describes an SiC sintered compact and the process for its production. As sintering aids carboranes and oxygen carriers (e.g. novolak resin) are likewise deposited on SiC powder from an organic solvent.

The dried powder is used to produce a moulding, which is subjected to an elaborate and time-consuming heating and sintering cycle. Although the escape of the decomposition products of carborane and oxygen carrier in the form of gases is slow, undesirable cracks, degasification channels and pores may be formed in the moulding.

As the carboranes deposited on the surfaces of the SiC particles are sensitive to hydrolysis, it is only possible to continue the processing of the powders in an atmosphere consisting of a protective gas.

DE-C 2 856 593 describes a process in which a very finely divided mixture of silicon dioxide and carbon is prepared by hydrolysis of a silicon dioxide gel in a sugar solution. The process in question is an expensive hydrolysis process in which water has to be removed in a laborious distillation step. SiC is finally formed on heating in an inert atmosphere. A mixture of SiC and $B_4C$ can be produced by incorporation of boric acid in the silicon dioxide gel.

The object of the present invention is to provide an SiC powder which is suitable for the production of SiC sintered ceramics and has none of the disadvantages of the prior art.

BRIEF DESCRIPTION OF THE INVENTION

It has now been found surprisingly that these requirements can be met excellently by an SiC powder suitable for the production of SiC sintered ceramics and having a surface coating consisting of compounds, these compounds being boron nitride and carbon and being present as a homogeneous coating on the surfaces of the individual SiC particles.

BRIEF DESCRIPTION OF THE DRAWING

FIGURE 1 illustrates the ion intensity ratios as a function of time for curve "B" for powder according to the present invention and the substantially linear curve "A" for silicon carbide particles with no surface coating.

DETAILED DESCRIPTION OF THE INVENTION

The silicon carbide powder of the present invention comprises a plurality of individual silicon carbide particles having a homogeneous surface coating of compound which is thermally decomposable to boron nitride and carbon or amorphous precursors thereof.

This SiC powder is the subject of the present invention.

Irrespective of whether the compounds according to the invention are present as a coating on the SiC powder in the partly or fully pyrolyzed form, a homogeneous coating is always desirable. Preferably, therefore, the compounds boron nitride and carbon are present on the surfaces of the individual SiC powder particles as a homogeneous layer. In this connection, of course, it is desirable that the coating be as continuous as possible. The thickness of the homogeneous layer is 0.5 to 40 nm, more preferably 0.5 to 15 nm.

In a preferred embodiment the SiC powder according to the invention has a boron content of 0.1 to 4% by weight, a nitrogen content of 0.1 to 4% by weight and a free carbon content of 0.5 to 5% by weight. In a particularly preferred embodiment the boron content is 0.1 to 1% by weight, the nitrogen content 0.1 to 1% by weight and the free carbon content 0.5 to 4% by weight.

The quality of the surface coating with boron nitride and carbon of the SiC powder according to the invention can be determined by depth profile investigations by secondary ion mass spectrometry (SIMS).

The following measurement parameters were selected for the SIMS investigation of the SiC powders: primary ions $Ar^+$ (argon cathode), 10 keV (kilo-electron volt), current $3.6 \times 10^{-8}$ A (ampere), beam diameter 0.75 mm, mixing of the SiC powder with pure silver powder in the ratio 1:4 to prevent charging of the powder surface.

In cases where, in a state-of-the-art doped SiC powder, the additives containing boron, nitrogen and carbon are present in addition to the SiC particles, the characteristic ions of the boron and silicon will appear with uniform intensity during the SIMS measurement, irrespective of the time taken by the measurement.

Where a coating of the SiC particles with the boron-containing additive is present, the intensity of the boron signal diminishes on account of the eroding effect of the argon ions, yet at the same time the intensity of the Si signal increases through exposure of the SiC layers, until an equilibrium is established under the above conditions after a period of about 40 to 60 minutes.

For a quantitative evaluation it is possible to use a calibration mixture consisting of SiC powder containing a known quantity of boron nitride and carbon, on which the ion intensities of boron and silicon are measured and converted into the concentration of BN and SiC on the basis of the known stoichiometry.

The SiC powder is coated according to the invention with the compounds boron nitride and carbon when the enrichment factor K, which is defined in DE-A 3 637 506 with reference to the example of $Si_3N_4$ powder, assumes a value greater than 4.

The surface enrichment factor K is defined as follows:

$$K = \frac{\frac{BN \text{ concentration}}{SiC \text{ concentration}} \text{ of the sample at } t = 0 \quad (= \text{grain surface})}{\frac{BN \text{ concentration}}{SiC \text{ concentration}} \text{ of the sample at } t = 60 \text{ min} \quad (= \text{grain interior})}$$

The surface enrichment factor assumes a value of 1 when there is no coating of the SiC material and the ratio of the concentrations at the beginning of ion bombardment (t=0) and after a substantial period (t=60 minutes) remains the same. Every factor of K greater than 1 signifies an enrichment of the additive on the surface. The factor depends largely on the quantity of additive (thickness of the enrichment layer) and penetration depth of the ion beam (erosion rate of the beam).

SiC powders with a surface enrichment factor K greater than 4 have a coating of additives containing boron, nitrogen and carbon which is sufficient to improve their sintering properties.

The SiC powder according to the invention can be obtained by pyrolyzing at 100° to 1200° C. an SiC powder having a coating of compounds that are thermally decomposable to boron nitride and carbon. The pyrolysis can be performed under inert conditions, preferably in an atmosphere of argon, or—for the purpose of achieving accelerated degasification of the decomposable compound—at low pressure.

In a preferred embodiment the compound or compounds decomposable to boron nitride and carbon is/are an adduct or adducts of a boron-containing Lewis acid with an aromatic or aliphatic amine or a nitrogen-containing aromatic.

An adduct or adducts of borane with methyl, dimethyl, trimethyl, ethyl, diethyl or triethyl amine or with piperidine is/are preferred. The amine/borane adducts are readily accessable and can be produced at very good yields, for example in a one-pot reaction by reaction of alkali boronates with primary, secondary and tertiary amines in the presence of elemental sulphur (Z. Naturforsch. 32 b, (1983) 203-207). Numerous amine/boranes are also commercially available.

The compound pyridine-borane $BH_3 \times C_5H_5N$, is particularly preferred.

Particularly good SiC powders are present when the nature of the decomposable compounds is such that their thermolysis residues exceed 25% or preferably 45%.

Similarly, a molar boron-to-nitrogen ratio of 0.8 to 1.2 is desirable.

The present invention also relates to a process for the production of the SiC powders according to the invention, characterized in that the decomposable compounds are dissolved in a suspension of SiC containing an organic hydrocarbon or chlorinated hydrocarbon solvent, preferably diethyl ether, benzene, toluene, diglycol dimethyl ether, dioxane, methylene chloride or tetrahydrofurane, the solvent is removed in vacuo at normal pressure under inert gas and the residue is decomposed thermally to boron nitride and carbon.

To obtain a homogeneous distribution of the molecular compounds on the powder surface, the quantity of the compound according to the invention containing boron, carbon and nitrogen is chosen so that the entire surface of the individual SiC particles is coated to a depth of at least one monolayer and, after the thermal decomposition of the compound, a coating of boron nitride and carbon is produced on the surface of the individual particles, boron remaining in quantities of 0.1 to 4% by weight, nitrogen in quantities of 0.1 to 4% by weight and carbon in quantities of 0.5 to 5% by weight.

As pyridine-borane, for example, is liquid at room temperature, the SiC powder may, on the one hand, be impregnated with this liquid, or, on the other hand, be suspended in a pyridine-borane solution. Dispersion is obtained by mechanical stirring of the SiC powder in the solution mentioned, followed by ultrasonication.

In one advantageous embodiment of the process for producing the SiC powder according to the invention the borane compound is dissolved in an organic hydrocarbon or chlorinated hydrocarbon solvent, such as diethyl ether, benzene, toluene, diglycol dimethyl ether, dioxane, methylene chloride or tetrahydrofurane.

The surface coating consisting, for example, of the pyridine-borane from the solution is produced by evaporating the solvent by distillation at normal pressure or reduced pressure with simultaneous motion of the solid under inert gas and isolation of the residue. The solvent is preferably evaporated by spray drying or freeze drying. It is of course possible to remove the solvent by other methods, such as the introduction of an inert gas or spin-flash drying.

Finely ground SiC powder, which may be present both in the α-phase and the β-phase or which may be amorphous, is used as the ceramic starting material for the production of the SiC powder according to the invention. The SiC powder according to the invention is produced by depositing the monomeric borane compound on the SiC powder surface, sieving the doped SiC powder, polymerizing the borane adduct by heating at 100°-200° C. and finally, after an increase in temperature, by reacting the borane adduct to boron nitride and carbon by heating it in an inert atmosphere at 100° C. to 1200° C. over a total heating period of 0.2 to 10 hours.

In the above-described process for production of the SiC powder according to the invention the free-flow properties and particle fineness of the SiC powder are not impaired the thermolysis, a fine-grained powder doped with boron and carbon being obtained.

The present invention also relates to the use of the SiC powders according to the invention produced by the process according to the invention for production of SiC sintered mouldings.

The sintered mouldings are produced in the known manner by moulding and compaction, subsequent drying or dewaxing of the green compact and sintering at temperatures of 1600° to 2300° C. in an inert atmosphere.

Processes such as slip casting in non-aqueous solvents or injection moulding followed by drying or dewaxing of the green moulding are used to produce SiC sintered mouldings from the SiC powder according to the invention. The firmly adhering layer of boron nitride and carbon on the individual particles of the SiC powder according to the invention has a beneficial effect because it is retained even under the influence of organic solvents, thus ensuring homogeneous distribution of the sintering aid in the green moulding.

In the subsequent compaction of the mouldings by the normal sintering methods, such as hot press moulding, hot isostatic pressing or pressureless sintering under a vacuum or in an inert atmosphere at 1600°-2300° C. only CO is set free in the deoxidation of the $SiO_2$ layer present in the SiC. Other degasification products are not formed from the SiC powder according to the invention; hence the possibility of significant crack, channel or pore formation can be excluded. In the case of pressureless sintering it is possible to produce sintered SiC mouldings having densities exceeding 95% of the theoretical value.

An important advantage resulting from the use of the SiC powder according to the invention is that, because the coating of boron nitride and carbon on the SiC particles is homogeneous and superficial, grain growth is greatly reduced despite the high sintering temperatures, so that an extremely narrow particle size distribution with mean particle sizes of less than 2 $\mu$m and maximum particle diameters of less than 5 $\mu$m is measured in the structure. In addition the elongate grain growth characteristic of SiC is suppressed.

By comparison, SiC powders prepared conventionally with boron- and carbon-containing sintering aids show distinctly poorer compaction on the one hand and more pronounced grain growth on the other hand during sintering. In their case the structure shows a broader particle size distribution with mean particle diameters exceeding 3 $\mu$m and maximum particle diameters of up to 40-50 $\mu$m.

The following Examples are intended to illustrate the invention without limiting it in any way.

EXAMPLE 1

In a quartz flask with faucet 1.6 g (1.74 ml) pyridine-borane, $BH_3 \times C_5H_5N$, is heated for 100 minutes at 108° C. in an argon atmosphere. A transparent, orange-coloured solid is formed and is heated to 1000° C. at a rate of 5 K/minute, leaving a silvery and frothy residue.

TGA/DTG measurements reveal a maximum decomposition rate at 425° C. The X-ray-amorphous pyrolyzate is formed in a yield of 53% by weight (calculated on the pyridine-borane input) and, according to elemental analysis, has the following composition: C (62% by weight), B (17.5% by weight), N (17.8% by weight), O (0.78% by weight). The IR spectrum of the pyrolysate shows two intensive absorption bands at 1382 and 818 cm$^{-1}$ which may be assigned to the oscillation frequencies of BN (1370 and 818 cm$^{-1}$, BN A01, a product of H. C. Starck, Berlin).

EXAMPLE 2

In a one-necked flask with faucet 98 g SiC is suspended under argon in 500 ml of tetrahydrofurane (THF) which has been dried over Na/K alloy. 6 g (6.5 ml) pyridine-borane complex is then added. For better dispersion of the SiC suspension the stoppered flask is ultrosonicated for 20 minutes and its contents are then stirred for 18 hours under argon. During removal of the THF by distillation at 0° C. and 10$^{-1}$ mbar, the pyridine-borane is deposited homogeneously on the SiC powder particles.

The powder doped and dried in this way is sifted under argon (mesh width d=140 $\mu$m) and heated for 100 minutes at 108° C. in a quartz flask in the way described in Example 1.

An SiC powder having the following composition is obtained:

Si=65.1% by weight; C=30% by weight; B=0.55% by weight; N=0.66% by weight; O=0.89% by weight.

The molar B:N ratio is 1.08.

The pre-pyrolyzed powder is then heated to 1000° C. at a rate of 5 K/minute as in Example 1 and kept at that temperature for 15 minutes.

Chemical analysis of the thermolysis residue reveals a silicon content of 65.7% by weight, a carbon content of 31% by weight, a boron content of 0.44% by weight, a nitrogen content of 0.60% by weight and an oxygen content of 1.0% by weight. The powder is distinguished by a molar B:N ratio of 0.95 and by an excess carbon content of 2.85% by weight.

EXAMPLE 3

SiC powder (96.9%), BN powder (1.1%) and lampblack (2.0%) were homogenized by mixing and grinding in a vibrating disk mill.

0.75 g silver powder was added to 0.25 g of the mixture, which was then rehomogenized and subjected to depth profile measurements by SIMS (measurement parameters: primary ions Ar$^+$, 10 keV, current $3.6 \times 10^{-8}$ A, beam diameter 0.75 mm). The ion intensity ratios B$^+$/Si$^+$ standardized to Si$^+$ are shown as a function of time in FIG. 1. An almost linear curve (curve A in FIG. 1), indicating that there is no surface coating of the SiC particles by the additive, is obtained for the mixture.

The mixture is used as calibration standard for further measurements.

After 0.25 g powder had been mixed with 0.75 g silver powder, the borane-pyridine-doped SiC powder produced according to Example 2 and heated in an argon atmosphere at 1000° C. was subjected to depth profile measurements by SIMS (primary ions Ar$^+$, 10 keV, current $3.6 \times 10^{-8}$ A, beam diameter 0.75 mm).

The following concentrations (in % weight) are obtained from the measured ion intensities:

for t=0 min (grain surface) cBN=2.6%; cSiC=97.4% for t=60 min (grain interior) cBN=0.5%; cSiC=99.5%.

The surface enrichment factor assumes the following value:

$$K = \frac{\frac{2.6}{97.4}}{\frac{0.5}{99.5}} = 5.3$$

The ion intensity ratios B$^+$/Si$^+$ standardized to Si$^+$ are shown as a function of time in FIG. 1, curve B. The curve of the powder according to the invention coated with boron nitride and carbon shows a distinct reduction in intensity of the B$^+$ ions as a function of time and thus indicates surface coating of the individual SiC particles.

EXAMPLE 4

In a quartz flask with faucet 5.64 g piperazine-borane, $BH_3 \times C_4H_{10}N_2$, was heated in an argon atmosphere to 1000° C. at a rate of 5 K/minute and kept at this temperature for 15 minutes. A vacuum at a pressure of less than 5 Pascal was then applied and maintained for a further 45 minutes during the heating.

The silvery black pyrolysate is formed in a yield of 50% by weight (calculated on the piperazine-borane input).

According to elemental analysis the pyrolysate has the following composition:
B: 22.4% by weight
N: 28.0% by weight
C: 47.0% by weight
O: 1.7% by weight
The molar B:N ratio is 1.04.

The IR spectrum of the pyrolysate is comparable with that mentioned in Example 1 and has absorption bands at 765 and 1380 cm$^1$.

We claim:

1. An SiC powder with compounds applied to its surface suitable for the production of SiC sintered ceramics and characterized in that the compounds are boron nitride and carbon and are present as a homogeneous coating on the surface of the individual SiC particles, wherein the content of boron is 0.1 to 4% by weight, the content of nitrogen 0.1 to 4% by weight and the content of free carbon 0.5 to 5% by weight.

2. An SiC powder according to claim 1 characterized in that the homogeneous layer has a thickness of 0.5 to 40 nm.

3. An SiC powder according to claim 1 characterized in that the content of boron is 0.1 to 1% by weight, the content of nitrogen 0.1 to 1% by weight and the content of free carbon 0.5 to 45 by weight.

4. SiC powders according to claim 1 and characterized in that the decomposed from compounds are an adduct or adducts of a boron-containing Lewis acid with an aromatic or aliphatic amine or a nitrogen-containing aromatic.

5. SiC powders according to claim 1 characterized in that the decomposable compounds are an adduct or adducts of borane with methyl, dimethyl, trimethyl, ethyl, diethyl or triethyl amine or piperdine.

6. SiC powders according to claim 1 characterized in that the decomposed from compounds is borane-pyridine.

7. A process for production of SiC powder with boron nitride and carbon compounds present in a homogeneous coating on the surface of individual SiC particles wherein the content of the boron is 0.1 to 4% by weight, the content of nitrogen 0.1 to 4% by weight and the content of free carbon 0.5 to 5% by weight, characterized in that the decomposable compounds are dissolved in a suspension of SiC with an organic solvent consisting of a hydrocarbon or chlorinated hydrocarbon, the solvent is removed in a vacuum or at normal pressure under inert gas and the residue is pyrolized to boron nitride and carbon.

8. The process for production of SiC powders according to claim 7 and characterized in that the residue is pyrolized for 0.2 to 10 hours at a temperature up to 1200° C. in a thermal treatment in an inert atmosphere.

9. An SiC powder according to claim 2 characterized in that the homogeneous layer has a thickness of 0.5 to 15 nm.

10. The process for production of SiC powders according to claim 7 wherein the organic solvent is selected from the group consisting of diethyl ether, benzene, toluene, diglycol dimethyl ether, dioxane, methylene chloride and tetrahydrofurane.

* * * * *